1,732,152

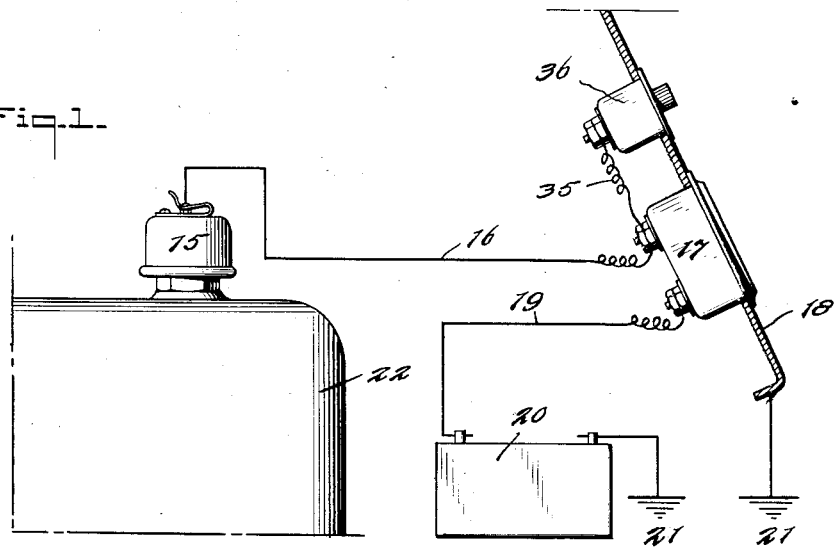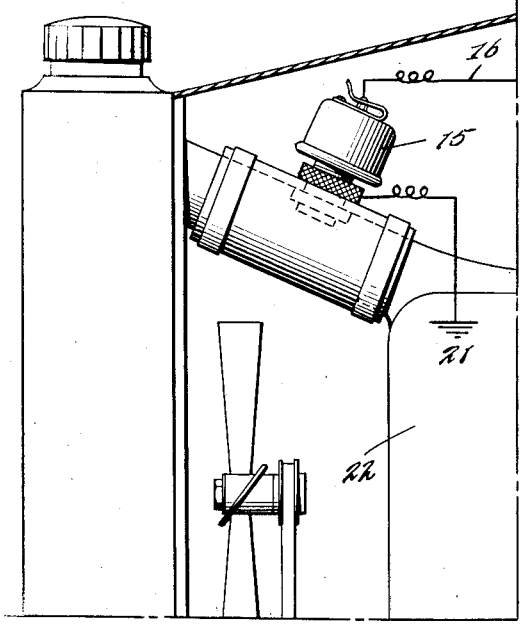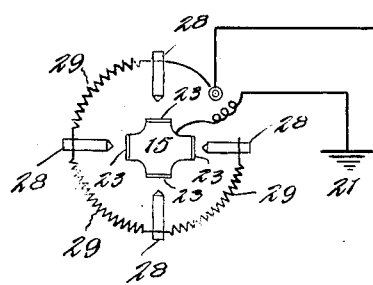

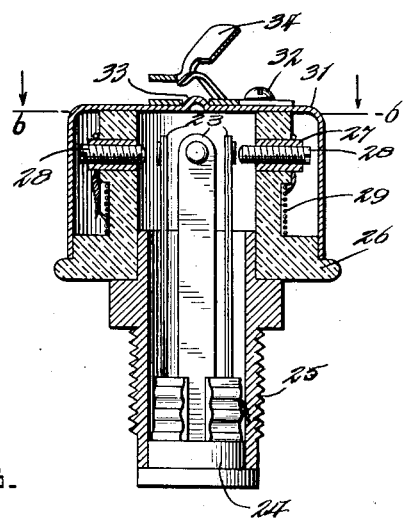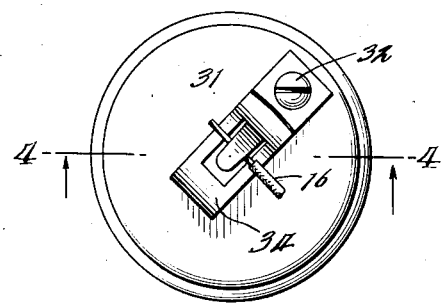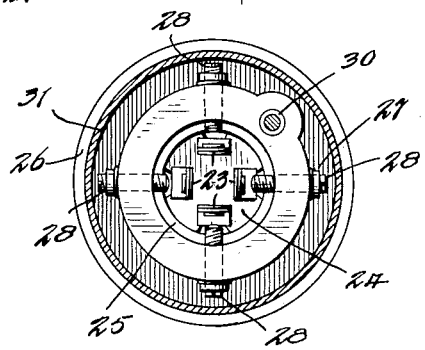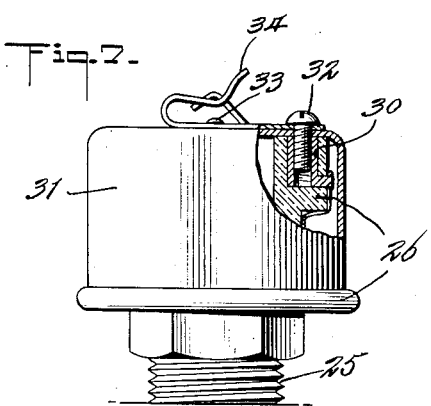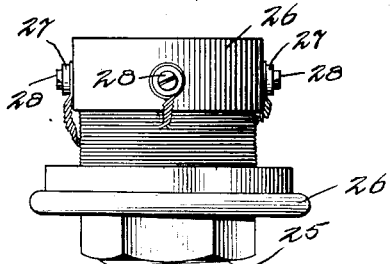
Inventors
William A. Collins
and Charles Jardine
by their attorneys
Howson and Howson Patented Oct. 15, 1929

UNITED STATES PATENT OFFICE

WILLIAM A. COLLINS, OF BROOKLYN, NEW YORK, AND CHARLES JARDINE, OF EAST ORANGE, NEW JERSEY, ASSIGNORS TO THE SAFE-T-STAT COMPANY, OF NEW YORK, N. Y., A CORPORATION OF DELAWARE

TEMPERATURE-INDICATING MEANS

Application filed May 13, 1926. Serial No. 108,882.

Our invention relates to means for indicating temperature at any desired distance from its point of occurrence. More particularly it relates to convenient means for indicating the temperature of automobile and airplane engines, and for testing the working condition of a cooperating source of energy.

Among the objects of our invention may be mentioned:

(1) The provision of an apparatus which will constantly indicate the existing temperature condition of an engine, and which will give instant warning of overheating.

(2) The provision of improved means for indicating the temperature of an inclosed substance.

(3) The provision of simple indicating means which may be located at any convenient point remote from the point whose thermal condition is to be indicated.

(4) Elimination of the lag which usually exists in the action of temperature indicating apparatus.

(5) Enabling the apparatus to read in jumps or steps, and by suitable markings on the indicator eliminating any necessity for the user to interpret the reading.

(6) The provision of associated means whereby the potential of the battery which operates the indicator may be measured.

Having in view these stated objects and others which will appear as the invention is described more fully hereinafter, we employ a novel construction and combination of parts consisting in a specially constructed thermo-sensitive element placed in contact with the substance whose temperature is to be indicated, and an electrically responsive indicator conveniently located, these two parts being connected together in series with a source of electrical energy by means of suitable electrical connections. An electric circuit is thus provided between the thermo-sensitive element and the electrically responsive indicator, which the action of the thermo-sensitive element is adapted to close.

We prefer to describe and illustrate our invention in its application to an automobile engine cooling system (although we do not confine ourselves to such an embodiment).

In the accompanying drawings,

Figure 1 is a partial side elevation of an automobile to which our invention is applied, the thermo-sensitive element being screwed into the engine block;

Fig. 2 is a side elevation of a modification wherein the thermo-sensitive element is clamped into the connecting hose of the cooling water system;

Fig. 3 is a semi-diagrammatic sketch of the parts and connections, illustrating in detail the face of the electrically responsive indicator;

Fig. 4 is a vertical section of the specially constructed thermo-sensitive element taken along the line 4—4 of Fig. 5;

Fig. 5 is a top view of the thermo-sensitive element showing the means by which this part is connected to the special voltmeter;

Fig. 6 is a horizontal section of the thermo-sensitive element taken along the line 6—6 of Fig. 4;

Fig. 7 is an elevation of the thermo-sensitive element partially cut away and in section to show the electrical connection at its top;

Fig. 8 is an elevation of the thermo-sensitive element without the cap piece.

In the drawings, which, as stated, relate to an automobile or airplane, a thermo-sensitive element or thermostat 15 is placed in contact with the cooling fluid and is connected by a wire 16 with an electrically responsive indicator here shown as a voltmeter 17 having a specially designed face, preferably located upon the instrument board or dash 18. A second wire 19 connects the voltmeter 17 with the usual automobile battery 20. Both the terminal of the battery not connected with the wire 19 and that of the thermostat not connected with the wire 16 are grounded to the automobile frame 21, thus completing the electric circuit.

Temperature ranges of the cooling water within which exist certain recognized running conditions of the engine are determined. For example, these ranges may include, successively, (1) those temperatures at which the engine may be said to be running "cool", (2) those at which the engine will normally run in the winter time, (3) those at which the engine will operate effectively in summer, and (4) a danger range indicating overheating.

The thermostat is so constructed as to close the circuit through a predetermined corresponding resistance for each temperature range of the cooling fluid with which it is in contact. Thus the battery potential remaining substantially constant, a different current is caused to flow through the voltmeter for each temperature range; and the voltmeter is graduated to read directly the temperature range so indicated.

The thermostat may be used to indicate temperatures at various parts of the engine, thus Figure 1 shows the thermostat projecting through the engine block 22 into the cooling water contained therein, and Figure 2 illustrates its application to the hose connection of the radiator. In each case the thermostat is grounded through the engine block 22 to the automobile frame.

The thermo-sensitive element comprises a part constructed of insulating material and a metallic part attached thereto. A plurality of bi-metal blades are each restrained at one end in metallic contact with the metallic part. A plurality of contact pins are carried by the first-named part (i. e., the part constructed of insulating material) each pin being opposite the free end of a bi-metal blade. We prefer to make the contact pins adjustable, for a purpose which will later appear. A terminal member is provided, and resistance wire connects the terminal member with the contact pins. There is also provided means for holding the metallic part in position when it is projected through a container wall.

In the embodiment illustrated the thermo-sensitive element 15 consists of four bi-metal blades 23 attached to a plug element 24 which fits snugly into the end of a tubular metallic container 25, and may be soldered therein, forming the fixed end of the thermostat. This tubular metallic container 25 is firmly affixed to a second tubular part 26 made of insulating material adapted to support contacts for the free ends of the bi-metal blades 23 in the following manner. Carried by this second tubular part 26 and surrounding the upper ends of the blades 23 or the free end of the thermostat, are four internally threaded metallic bushings 27, whose axes extend radially at right angles to that of the container 25 and the part 26.

Into the bushings 27 contact pins 28 are screwed, their projection beyond the interior wall of the tubular part 26 being determined in a manner and for a purpose which will now be described.

It is desirable for the purposes of this apparatus, as will be more fully explained hereinafter, that a bi-metal blade 23 contact with a contact pin 28 at the lowest temperature of each of the ranges of temperature to be indicated. The thermo-sensitive element 15 is adjusted to this end in the following manner: The shank of the thermo-sensitive element 15 is subjected to the lowest temperature of the lowest range to be indicated. All of the bi-metal blades each having one end firmly affixed to the container 25 are distorted outward in consequence. A contact pin 28 in a bushing 27 is screwed in until it contacts with a coacting bi-metal blade 23.

The other three contact pins are similarly and successively adjusted to contact with a bi-metal blade 23 at the lowest temperature of successively higher temperature ranges.

The predetermined resistances above referred to are provided by a coil of fine resistance wire 29 which may be conveniently located upon a neck provided for the purpose upon the tubular part 26. One end of the coil 29 is attached to one of the metallic bushings 27, and the other end is attached to an adjacent bushing, which in turn is connected to a terminal bushing 30 of the thermostat. At two intermediate points the coil is tapped and connected with each of the other bushings 27.

The length of resistance wire between any contact bushing 27 and the terminal bushing is designed to give the circuit the predetermined corresponding resistance for each temperature range above mentioned.

A cover 31, preferably of metal, is provided, and is constructed to fit over the top of the tubular part 26, contacting with the top surface and lower shoulders thereof as best illustrated in Fig. 4. A hole is provided in the top of the cover 31 through which an attaching screw 32 may pass. Also there is a small projection 33 exactly in the center of the top surface of the cover for a purpose which will presently be described.

There is also provided a terminal spring clip 34 which rests upon the top surface of the cover 31, to which the wire 16 is attached.

The attaching screw 32 is screwed through the hole in the cover 31 into the terminal bushing 30, and holds in place not only the cover 31 but also the terminal spring clip 34. The terminal spring clip is of known construction having in its base leg a hole through which the shank of the screw 32 may pass, the screw head resting against the base leg itself and holding the clip in place. To prevent it from turning about the screw, the terminal spring clip 34 has a slot in its base leg which embraces the projection 33 and prevents lateral motion.

In this way the terminal spring clip 34 is electrically connected with the coil 29 and with all of the bushings through the screw 32 and the terminal bushing 30. Thus the cover 31 is insulated at all points except in its contacts with the attaching screw 32 and the terminal spring clip 34.

From the above it will be seen that, as the temperature of the cooling water rises successive contacts are made closing the circuit through successive steps of decreasing resistance. The battery potential remaining substantially constant, the current flowing through the voltmeter is increased in definite steps as the temperature of the cooling fluid rises, and the successive thermostat blades 23 contact with the adjusted contact pins 28.

The voltmeter used may be of the usual low voltage type, its maximum reading preferably corresponding to the full voltage of the battery employed. However, a face having special readings thereon may be provided, in order, as above stated, that the temperature condition may be read directly. In Fig. 3 is illustrated a voltmeter face for use with an automobile. The readings "Cool", "Winter", "Summer", and "Danger" are positioned to correspond with the needle position when the four blades 23 successively make contact for these ranges.

The boiling point of alcohol (corresponding to a point in the permissible temperature range for summer driving) is indicated upon the voltmeter face. This is a very important consideration in winter driving.

However, no claim is here made to any particular type of voltmeter.

By means of that form of the invention here illustrated a very convenient means is obtained for telling at all times the thermal condition of an engine. The action of the apparatus is instant, and there is no time lag or interval between the occurrence of high temperatures and the warning of a dangerous condition. The indicating instrument is visible night and day and preferably indicates directly the engine condition, no accurate reading and dependent determination being required on the part of the driver.

With the understanding that the illustration herein given is merely used to indicate one form of our invention, and that many modifications will readily occur to those dealing with the problem without departing from what we claim as our invention, we claim:

1. In temperature indicating apparatus, a multiple thermo-sensitive unit comprising a tubular metallic container, bi-metal blades carried by said container, a second tubular part of insulating material to which said container is affixed, and contacts for the free ends of said bi-metal blades carried by said second tubular part, in combination with resistances connecting said contacts also carried by said second tubular part, an electrical connection with said resistances, and another electrical connection with said metallic container.

2. In temperature indicating apparatus, a multiple thermo-sensitive unit comprising a tubular part of insulating material, a tubular metallic container affixed thereto, bi-metal blades each having one end affixed to the container, and adjustable contacts for the free ends of said bi-metal blades carried by said tubular part of insulating material, in combination with resistances connecting said contact points also carried by said tubular part of insulating material, an electrical connection with one end of said resistance, and another electrical connection with said metallic container.

3. In temperature indicating apparatus, a multiple thermo-sensitive unit comprising a tubular part of insulating material, a tubular metallic container affixed thereto, a plug element fitting into the end of said container, bi-metal blades each having one end removably affixed to said plug, and adjustable contacts for the free ends of said bi-metal blades carried by said tubular part of insulating material, in combination with resistances connecting said contact points also carried by said tubular part of insulating material, an electrical connection with one end of said resistance, and another electrical connection with said metallic container, substantially as described.

4. A thermo-sensitive element comprising a part constructed of insulating material, a metallic part attached thereto, and a plurality of bi-metal blades each restrained at one end in metallic contact with said metallic part, in combination with a plurality of contact pins carried by said first-named part, each pin being opposite the free end of a bi-metal blade, a terminal member, resistance wire connecting said terminal member with said contact pins, and means for holding said metallic part in position when projected through a container wall.

5. A thermo-sensitive element comprising a part constructed of insulating material, a metallic part attached thereto, and a plurality of bi-metal blades each restrained at one end in metallic contact with said metallic part, in combination with adjustable contact pins carried by said first-named part, each pin being opposite the free end of a bi-metal blade, a terminal member, resistance wire connecting said terminal member with said contact pins, and means for holding said metallic part in position when projected through a container wall.

In testimony whereof we have signed our names to this specification.

WILLIAM A. COLLINS.
CHARLES JARDINE.